United States Patent [19]

Casey

[11] 4,221,187
[45] Sep. 9, 1980

[54] APPARATUS FOR RAISING FISH

[76] Inventor: Robert F. Casey, 22 Duggan Rd., Acton, Mass. 01720

[21] Appl. No.: 874,098

[22] Filed: Feb. 1, 1978

[51] Int. Cl.$^3$ .............................................. A01K 61/00
[52] U.S. Cl. ........................................................ 119/3
[58] Field of Search ...................... 119/3, 5; 210/169; 134/101

[56] References Cited

U.S. PATENT DOCUMENTS

| | | | |
|---|---|---|---|
| 518,319 | 4/1894 | Hoxsie | 119/3 |
| 3,116,712 | 1/1964 | Ogden et al. | 119/3 |
| 3,166,043 | 1/1965 | Castillo | 119/3 |
| 3,245,420 | 4/1966 | Cherney | 134/101 |
| 3,870,018 | 3/1975 | Fruchtnicht | 119/3 |
| 3,996,893 | 12/1976 | Buss | 119/3 |

Primary Examiner—Hugh R. Chamblee
Attorney, Agent, or Firm—Hamilton, Brook, Smith & Reynolds

[57] ABSTRACT

Apparatus for raising fish, such as rainbow trout, in a controlled environment is disclosed comprising a main fish tank equipped with means for providing laminar water flow through the tank and also equipped with sweeper means for removing particulate matter from the bottom of the tank.

16 Claims, 7 Drawing Figures

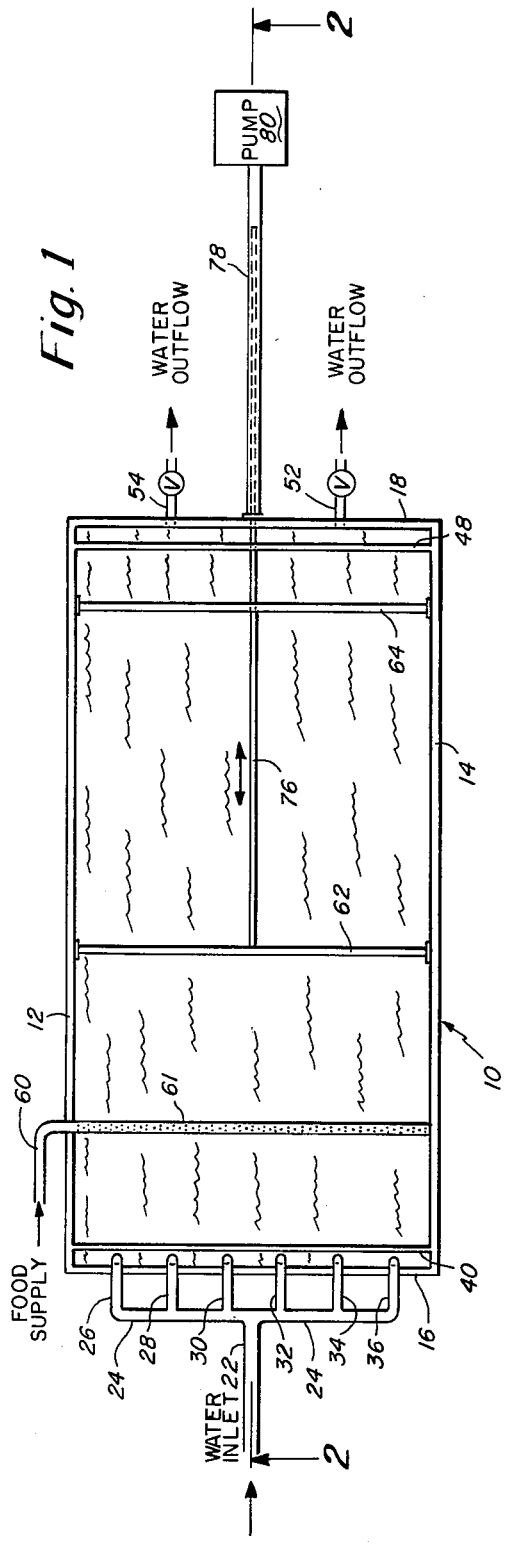
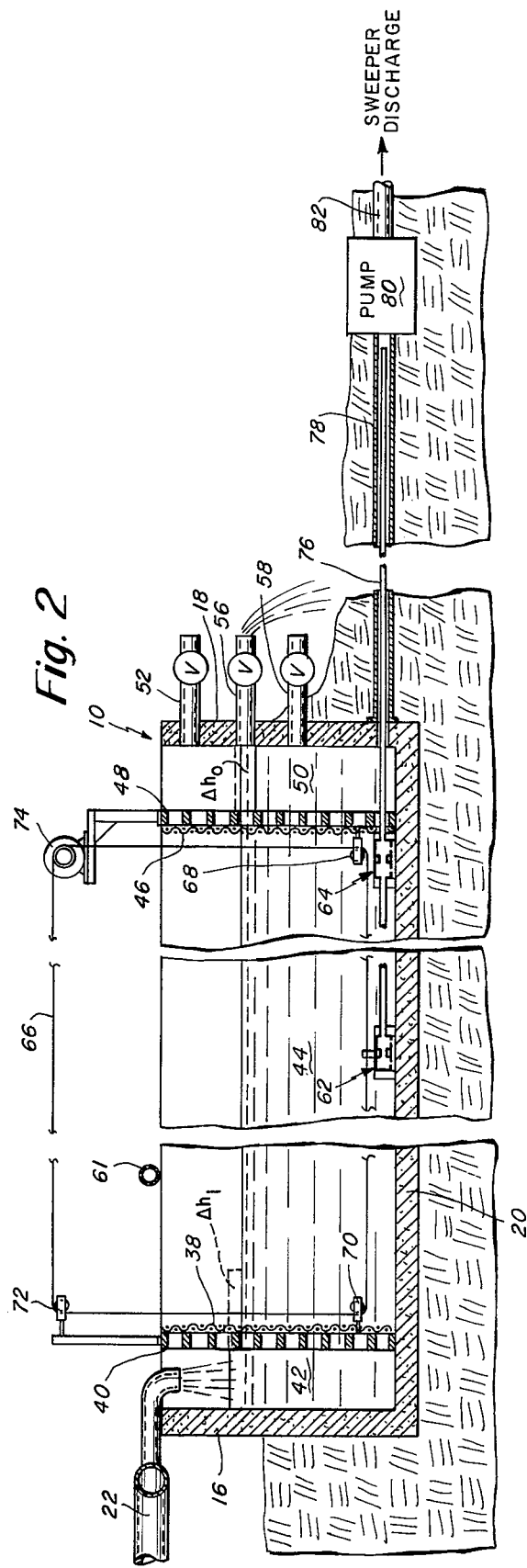

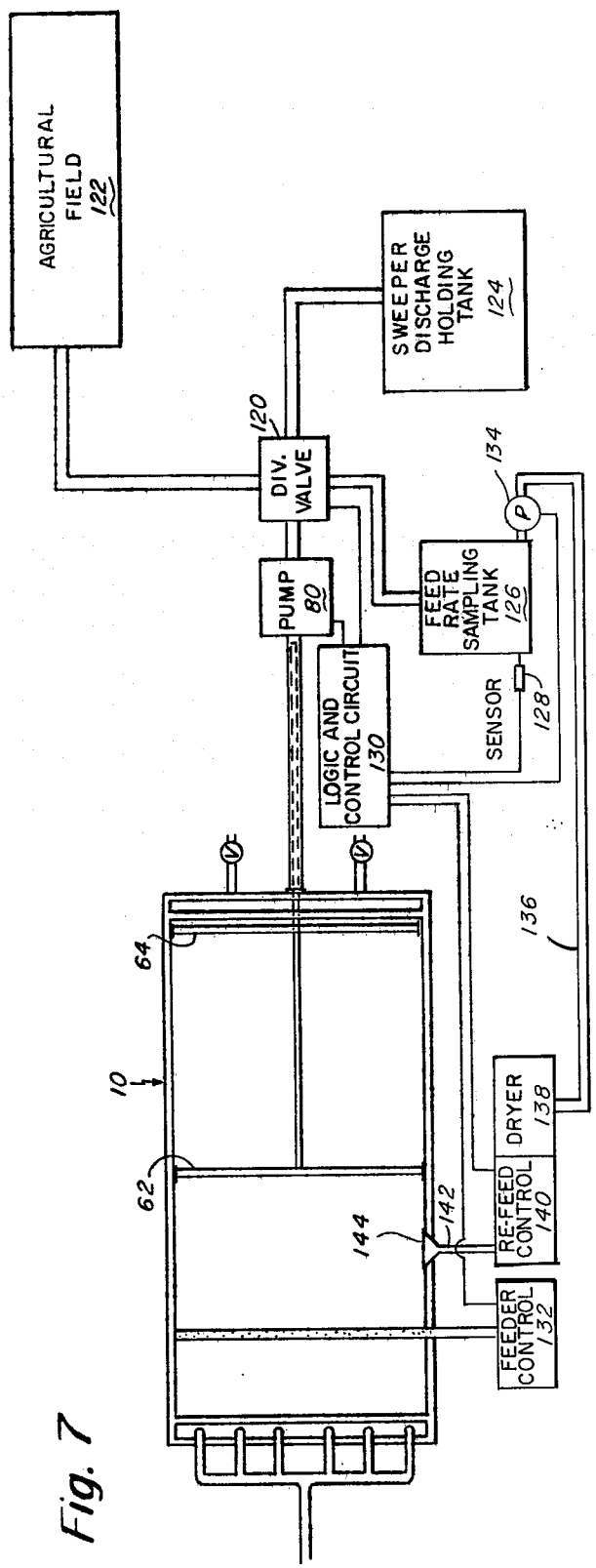
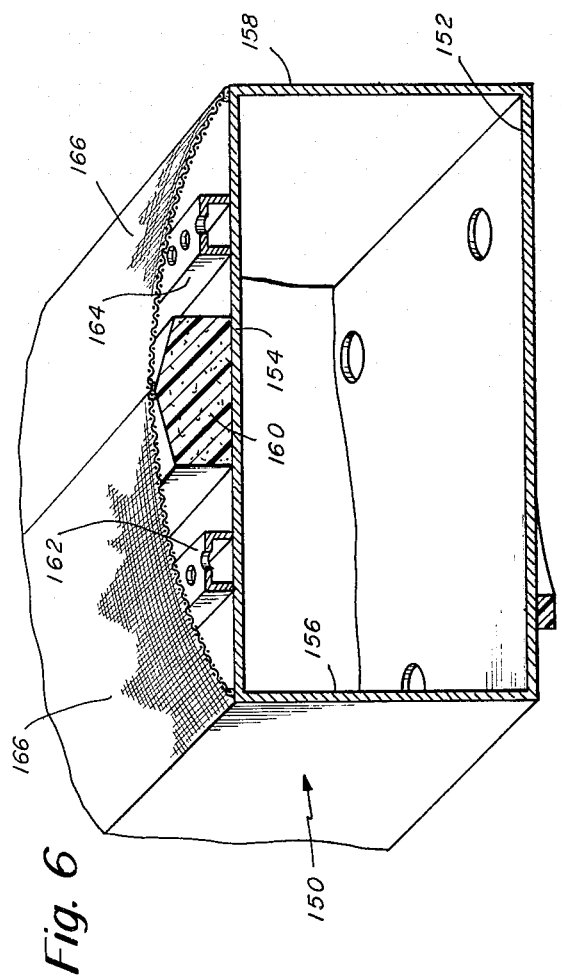
Fig. 7
Fig. 6

APPARATUS FOR RAISING FISH

BACKGROUND OF THE INVENTION

1. Field of the Invention

This invention is in the field of fish husbandry.

2. Description of the Prior Art

There have been many attempts to raise fish in large quantities for the commercial market. In order to successfully accomplish this, however, very careful control over the environmental conditions is required.

For example, the oxygen content of the water used to raise fish is extremely critical. If the oxygen level drops below a minimum level, fish will die. Usually, this minimum level is not far below the saturation level at the temperature of the water employed, which means that any significant depletion of the oxygen present will lower the level below that required.

Water temperature is also crucial. Rainbow trout, for example, seem to grow best at a temperature around the mid-50's (°F.). If the water temperature is raised too far above this value, disease becomes more prevalent. On the other hand, if the temperature is dropped too much below this value, the fish simply do not grow at a rapid enough rate to make the venture commercially viable.

Another serious problem is the accumulation of particulate matter at the bottom of a fish tank, especially metabolic waste and excess food. Accumulated metabolic waste tends to contaminate the water with its by-products, including ammonia, urea, and other compounds which are toxic for fish at relatively low levels. Leaching of toxic compounds from metabolic waste is aggravated if the waste is subjected to agitation, such as is the case if the water flow in the fish tank is too rapid or too turbulent.

Food is another variable in fish raising which must be carefully controlled. Food is, of course, expensive and overfeeding tends to take away from the commercial viability of the venture. This is particularly true with many commercial species of fish, such as salmonids, which are principally mid-water feeders. In addition, excess food accumulation also depletes oxygen since oxygen in the water is consumed in the decomposition of excess food. Excess food also serves as a breeding ground for bacteria which contributes to fish disease. Therefore, excess food is simply wasted, consumes oxygen, adds inordinate expense and contributes to disease.

On the other hand, underfeeding is also a problem since it results in a slower growth rate which detracts from the commercial viability of fish raising. Thus, it is extremely important in the commercial raising of fish to provide precisely the proper amount of food, and no more or no less.

In general, two types of systems have been employed in attempts to raise fish commercially. The first type have employed raceways which are elongated shallow channels through which vast quantities of water are flowed. Raceways provide little or no control, however, over the important variables, and so, their use has been limited to situations in which there is a natural supply of water which just happens to be right for raising fish. Thus, raceways are often employed near mountain streams having water at an appropriate temperature for fish raising.

The second type of fish raising systems are those employing fish tanks of one design or another. A variety of such systems have been designed in attempts to maximize one or more of these important parameters, and some of these are described in the patent literature. One example, described in U.S. Pat. No. 3,565,043, discloses a fish husbandry system which has an upper fish habitat compartment, with a water supply spray, and a lower control compartment separated by a slanted partition to guide waste matter and pollutants through an adjustable flow hole into the lower compartment. U.S. Pat. No. 3,583,365, describes an apparatus useful in concentrating live fish in a container for transfer to another location. U.S. Pat. No. 3,661,119 discloses a fish larvae rearing tank with a water circulation system for rapidly exchanging the water in the tank which is characterized by the fact that it produces minimum turbulence and air bubbles. U.S. Pat. No. 3,756,197 discloses a generally vertical, water-filled tank into which oxygen-containing gas is injected under pressure to a hood section which retains the oxygen so that it can be dissolved into the water. U.S. Pat. No. 3,771,492 discloses a system for handling large quantities of water, obtained from wells or springs, which is used to raise fish and which is subsequently returned into the earth.

Another fish raising tank that has been employed has a circular cross-section at its upper portion with sloping walls at its lower portion. The sloping walls are intended to create a whirlpool motion to water flowing through this tank in an effort to entrain particulate material and carry it out of the tank. This shape doesn't approximate a natural fish habitat, however, and has resulted in bunching of fish and an uneven distribution. The swirling action of water in such tanks also tends to agitate particulate matter, including metabolic waste, and this produces a leaching of toxic products which is highly undesirable. In addition, tanks of this type, or any other design requiring the action of rapidly flowing water to remove accumulated particulate matter, requires the flow of vast quantities of water which can create a severe environmental problem.

Thus, despite the many systems which have been conceived, none has proved satisfactory in environments in which the natural conditions are not just right for the commercial raising of fish.

SUMMARY OF THE INVENTION

This invention relates to an apparatus which is uniquely designed for the commercial raising of fish. While many varieties of fish can be raised in this apparatus, it is particularly suitable for raising salmonids, such as rainbow trout and Coho salmon.

The fish are grown in a main tank of suitable size for the number of fish it contains. While a rectangular shape is preferred, other shapes can also be employed. Water is introduced into one end of the fish tank using means for initiating laminar flow. Laminar flow requires the fish to expend only minimum exertion swimming and, yet, eliminates the creation of pockets of non-circulating water. Laminar flow also reduces the quantity of water required compared to other tank or raceway designs.

A particularly unique feature of this apparatus is the sweeper apparatus which is employed. This sweeper apparatus has one or more sweeper heads slidably mounted at the bottom of the tank so that they can move longitudinally across the surface of the tank bottom. The sweeper head assembly is attached to a pump which draws a relatively small quantity of water into the sweeper head and from the tank. This small quantity of water is sufficient to entrain particulate matter which has accumulated at the tank bottom.

The main purpose of this sweeper is to clean particulate matter, such as metabolic waste products and excess food, which has accumulated at the bottom of the fish tank. In addition, the sweeper may be provided with means to introduce oxygen into the tank as well as means to introduce a disinfectant, such as chlorine gas. Although chlorine is highly toxic, the unique sweeper design allows it to be used without contaminating the bulk of the tank.

Water picked up by the sweeper is pumped through an exit line, and by suitable valving means, can be directed to a holding tank, simply distributed over a ground area as fertilizer, recycled through a biological filter, etc. In addition, there can be provided a second tank, which is useful in measuring the amount of feed rate which should be employed.

Initially, the laminar flow of water employed in the tank requires a relatively small flow-through compared to raceways and other tank systems. This relatively small water flow greatly increases the ability to control other parameters of the growth environment, such as temperature. Also, the fish need to exert only minimum effort to swim against this flow. On the other hand, this flow minimizes the formation of stagnant pockets or pools of water in which waste products that build up.

Another advantage is realized by the efficient removal of metabolic waste products and excess food by the sweeper apparatus before they accumulate to levels which would interfere with fish growth. This is achieved with little or no interference with surface functions such as feeding, sampling, sizing and harvesting.

Thus, this apparatus combines efficient water usage with efficient waste removal and yet provides conditions appropriate for fish growth. Because of this, the areas in which fish can be commercially raised are greatly expanded beyond those few areas which just happen to have the proper conditions naturally.

BRIEF DESCRIPTION OF THE DRAWINGS

FIG. 1 is a top view of a main fish tank according to this invention;

FIG. 2 is a cross-sectional elevational view of the main fish tank of FIG. 1;

FIG. 6 is a perspective view of an alternative embodiment for a sweeper head; and, FIG. 7 is a schematic view of the overall fish raising system of this invention.

DESCRIPTION OF PREFERRED EMBODIMENTS

Figure 3:
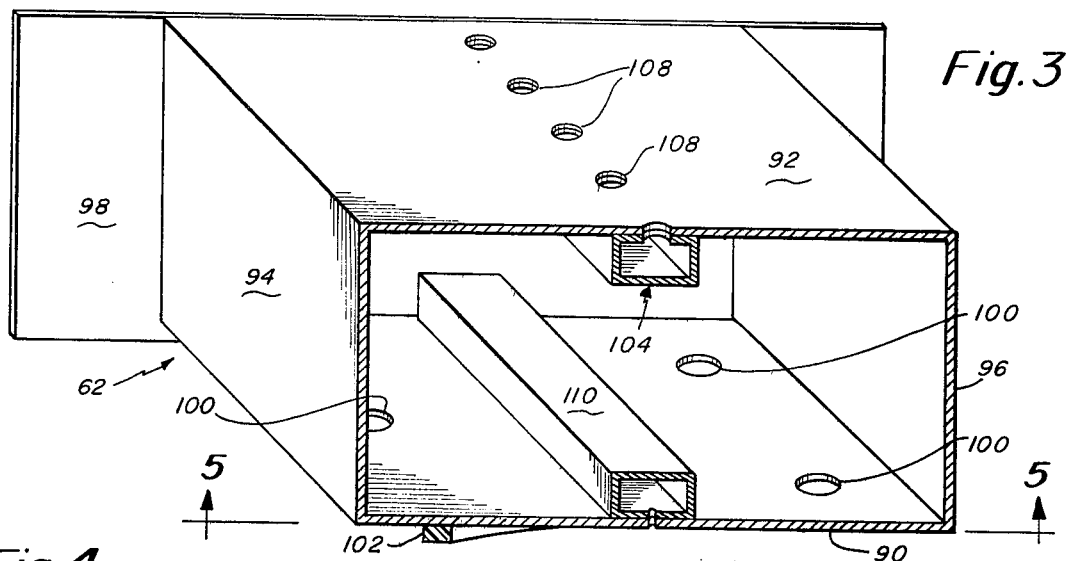
FIG. 3 is an exploded cross-sectional view of a sweeper, according to this invention.

The invention will now be further described in more detail with reference to the Figures.

FIGS. 1 and 2 illustrate a main fish tank 10 with its accompanying water inlet and outlet connections and a dual sweeper apparatus for cleaning particulate matter from the tank bottom. Therein, it can be seen that main fish tank 10 is a rectangular tank formed from planar side walls 12 and 14; planar end walls 16 and 18; and planar bottom 20. Other shapes could also be employed, of course. The exact dimensions can also vary over a wide range, but an example of a suitable rectangular tank would be one with dimensions of 80 ft × 40 ft × 7 ft, which would be suitable for raising rainbow trout in high densities. Suitable tanks can be constructed from a variety of material including metals, plastics, concrete, or a combination. It is preferred to provide smooth surfaces on the inside of walls 12, 14, 16 and 18 and also on the inside of bottom 20.

Water is introduced through water inlet pipe 22. Water flows from inlet pipe 22 into header 24 and is distributed through a series of smaller pipes 26, 28, 30, 32, 34 and 36, which empty into the top of the inlet end of tank 10. Water is introduced into tank 10 at a rate suitable for maintaining laminar flow in the tank as well as one which meets the demands of the fish, such as one which provides a sufficient initial oxygen level.

Very fine meshed screen 38 is positioned on support 40 at a short distance (e.g., 1½ feet on 80' tank) from inlet end wall 16. An example of suitable screen material is the forming fabric manufactured by Huyck Corp. for use in papermaking. The purpose of screen 38 is to establish laminar flow in tank 10, which means that the mesh of the screen should be very fine so that it causes a slight head of water to build up in the inlet reservoir 42. This head, which is exaggerated on FIG. 2 for purposes of illustration, is represented by $\Delta h_i$, and is equal to the difference in height between the surface of water in reservoir 42 and the surface of water in fish growth volume 44. At any height h on screen 38, therefore, the pressure on the reservoir 42 side is $h + \Delta h_i$, whereas the pressure on the other side is h, which yields a constant differential pressure across screen 38 of $\Delta h_i$. This uniform pressure differential over the entire surface of screen 38 produces laminar flow at the inlet end of tank 10. The rectangular shape of tank 10 is useful in maintaining this laminar flow through the water flow path.

At the exit end of tank 10, there is another screen 46, on support 48, which serves to minimize any disturbance of laminar flow at the exit end. Screen 46 may be made from the same screen material as screen 38, or it may be different. In any event, screen 46 serves to create a uniform differential pressure head, equal to $\Delta h_o$, at any height between water in fish volume 44 and water in outlet reservoir 50. This, of course, is the inverse of the situation at the inlet end. Again, for purposes of illustration, the pressure differential $\Delta h_o$ is exaggerated on FIG. 2.

Flowing water can exit from tank 10 through a series of outlet pipes, such as outlet pipes 52, 54, 56 and 58. Each has a corresponding outlet valve. As illustrated, the outlet pipes are arranged at different vertical heights to allow adjustment of the water level in tank 10. Water leaving tank 10 can be reused, of course, such as by recirculating it through a biological filter.

Means for introducing fish food are employed, such as the pneumatic feeder system shown which comprises a pneumatic system feed line 60 and feed distributor pipe 61. This pneumatic feeder blows feed across the surface of water within the tank. It is preferable to spread the feed over a large surface area so that all fish in tank 10 can have equal opportunity to feed. Therefore, a plurality of feed outlets could be used, as well as other systems, including mechanical or hydraulic systems. Examples of pneumatic fish feeding systems are described in detail in U.S. Pat. Nos. 3,526,210 and 3,786,784, the teachings of which are incorporated by reference.

The sweeper apparatus employed at the bottom of tank 10 has two sweeper heads, 62 and 64, which are connected so that they move in unison and, in combination, are able to sweep the entire tank bottom. They are driven in a slidable manner along the bottom surface of tank 10 by flexible drive line 66 connected by guide pullies 68, 70 and 72 to electric motor 74. Water containing entrained particulate matter is sucked from the bottom of the tank into either of sweeper heads 62 and 64 and transported by smaller conduit 76 which is slidably mounted within larger fixed conduit 78. Water and entrained material empty from smaller conduit 76 into larger conduit 78 which is connected to pump 80 which discharges material from the sweeper heads 62 and 64 into discharge line 82.

Figure 4:
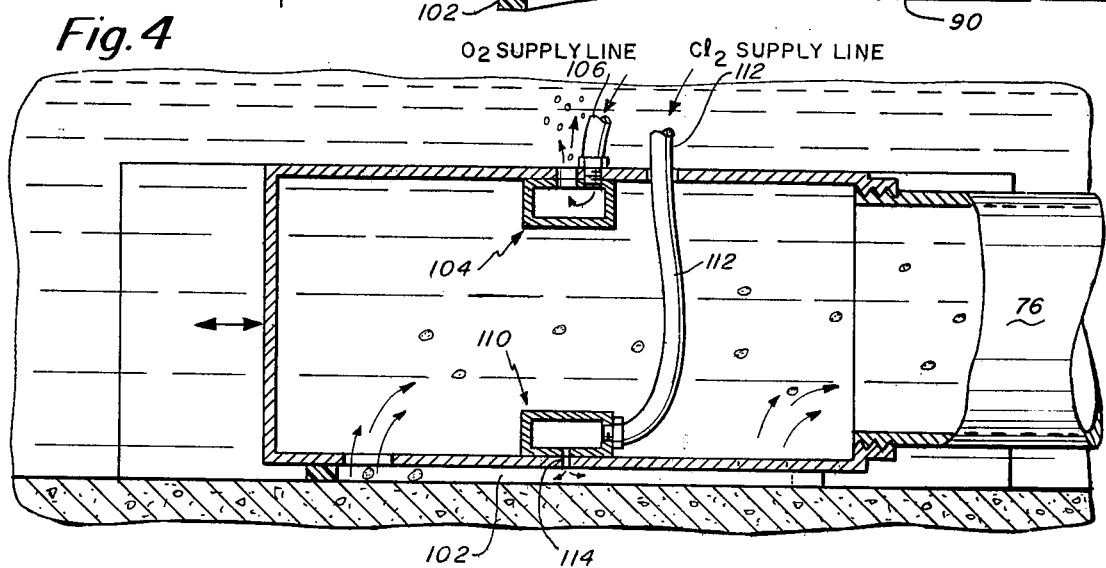
FIG. 4 is a side elevational view of the sweeper of FIG. 3.
Figure 5:
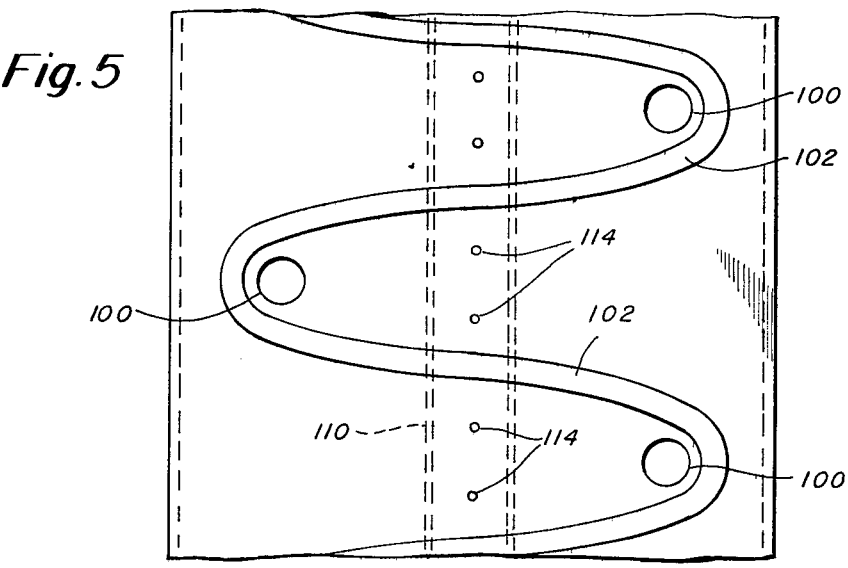
FIG. 5 is a view of the bottom of the sweeper of FIGS. 3 and 4.

The details of the construction of sweeper head 62 can be seen by referring to FIGS. 3-5. Therein, it can be seen that this sweeper head 62 has a general rectangular shape formed from bottom wall member 90, top wall member 92, and two side wall members 94, 96. Planar slide member 98 is attached at one end and serves to cover the end as well as to assist the sweeper head in maintaining proper alignment as it slides along the tank bottom. The bottom wall member contains a series of spaced holes 100 therein through which water is sucked from the bottom of the tank—this water carries entrained particulate matter with it. Holes 100 are spaced in a pattern to maximize coverage of the bottom surface as the sweeper head traverses back and forth. Sinusoidal shaped spacer 102 helps in directing water and entrained material towards the holes 100 as the sweeper head moves in either direction. Spacer 102 also slightly elevates the lower wall 90 of the sweeper head 62 from the tank bottom.

As sweeper head 62 traverses back and forth along the bottom surface of tank 10, it sucks up sufficient water to entrain particulate matter accumulated at the tank bottom. The quantity of water entering sweeper head 62 is small, of course, compared to the volume used in systems depending upon a flushing action to clean tanks or raceways. Typically, the ratio of water flowing through tank 10 to that sucked up by sweeper heads 62 and 64 would range from 10/1 to 100/1.

Water and entrained particulate material are pumped through smaller conduit 76 into larger conduit 78, and from conduit 78 to sweeper discharge line 82. Smaller conduit 76 is attached to side wall 96 via a standard screw-type pipe coupling.

Because smaller conduit 76 is slidably mounted within larger conduit 78, pump 80 can be mounted in a permanent position. Of course, it is also possible to use other arrangements to transport water and entrained particulate matter from the sweeper heads, including a slidable pump connected to one slidable conduit extending from the sweeper heads.

It can also be seen that a small channel 104 is attached to and runs along the inner surface of top wall member 92. This channel is connected to a supply line 106 for oxygen or an oxygen-containing gas such as air. Thus, oxygen can be introduced into channel 104 and distributed through a series of smaller holes 108 extending through the top of sweeper head 62, if the oxygen level in the water drops below the level desired to maintain good growth of fish.

It is also possible to introduce an auxiliary or emergency supply of oxygen through recessed channels in the tank bottom. This would normally be a problem because the accumulation of particulate matter would cause clogging, etc., but the sweeper means described herein will overcome these problems.

A second channel 110 is located on the inner surface of bottom wall member 90 which is connected to a supply line 112 of chlorine gas and provided with holes 114. This can be used to disinfect the bottom of the tank and kill microorganisms which have built up there and might lead to disease in the fish. Although chlorine is toxic to fish, it can be used in this system because it is maintained locally beneath the surface of sweeper head 62 and never has an opportunity to reach the fish growing volume 44.

The sweeper can be formed from many materials and is preferably formed from a material which is resistant to corrosion, such as aluminum or plastics.

FIG. 6 illustrates an alternative sweeper head construction. Thus, sweeper head 150 has a generally rectangular shape formed from bottom wall 152, top wall 154, and side walls 156 and 158. Support 160 is positioned at the outside center of top wall 154 and serves two purposes. The first purpose is that of adding buoyancy to sweeper head 150 which is achieved since support 160 can be formed from a foamed polymer, or other materials, which have good buoyancy in water. The size and shape of support 160 can be adjusted to provide as much buoyancy as desired, of course.

The second purpose for support 160 relates to the retention and diffusion of oxygen-containing gas released from channels 162 and 164. As illustrated, fabric or mesh envelopes 166 are fastened at the sides of sweeper head 150 and onto support 160 so as to provide two oxygen-containing and diffusing chambers. These assist greatly in dissolving oxygen in the water so that the fish can use it. Of course, there may be only one chamber, or for that matter, more than two, and these can have a wide variety of designs.

FIG. 7 illustrates a schematic view of an overall fish husbandry system including a fish tank as described above. Metabolic waste products and excess food sucked up by the sweeper heads 62 and 64 can be pumped to a number of locations through divertor valve 120. If it is desired to simply dispose of these products, divertor valve 120 can be directed to dispose of the output from pump 80 to a disposal area, such as agricultural field 122. Alternatively, divertor valve 120 can be positioned to direct outflow from pump 80 to a large waste holding tank 124. Although not shown, the pump output could also be returned into the ground below the frost level in winter.

Still another option is to position divertor valve 120 to direct pump effluent to feed rate sampling tank 126. Feed rate sampling tank 126 can be used to determine whether the proper amount of feed is being added to fish tank 10. It is very difficult to accurately measure the number of fish within the tank, and therefore, to gauge how much feed should be added. With this system, the tank can be swept clean of particulate matter on the bottom by sweeper heads 62 and 64. Immediately thereafter, feed can be added in a predetermined amount which is an estimate of that required. Since rainbow trout and other salmonids are principally mid-water feeders, excess feed not consumed by the fish will fall to the bottom of the tank. Therefore, if the tank is swept shortly after feeding, the amount of feed picked up by sweeper heads 62 and 64 will be an accurate measure of the excess feed introduced.

Thus, excess food picked up by sweeper heads 62 and 64 is pumped through divertor valve 120 which is positioned to transport this to feed rate sampling tank 126. A sensor 128, which might be an optical sensor, for example, senses the amount of food which was not consumed by the fish. Sensor 128 transmits a signal to logic and control circuit 130 which then transmits an appropriate signal to feeder control 132 to adjust the amount of food introduced in the next feeding. An auxiliary pump 134 can be used to empty sampling tank 126 by pumping the contents thereof to dryer 138. Dried food is then reintroduced into tank 10 through re-feed controller 140, re-feed supply line 142 and feeder outlet 144. It is not necessary, of course, to spread the recycled food, which will normally be only a small amount, over a wide surface area. It is also not necessary to dry this recycled feed which may be introduced wet by a hydraulic recycle system.

Those skilled in the art will recognize or be able to determine using no more than routine experimentation, many equivalents to the specific apparatus illustrated herein. Such equivalents are considered to be within the scope of this invention and are intended to be covered by the following claims.

What is claimed is:

1. An apparatus for cleaning particulate matter from the bottom of a liquid-containing tank, comprising:
    a. sweeper head means slidably engaged at the bottom of said tank;
    b. pump means for pumping liquid and entrained particulate matter from the bottom of said tank through said sweeper head;
    c. larger fixed conduit means for transporting liquid from said sweeper head to said pumping means; and,
    d. smaller conduit means slidably engaged within said larger fixed conduit means, said smaller conduit means being connected to said sweeper head whereby it serves to transport liquid from said head to said larger, fixed conduit means.

2. An apparatus of claim 1 wherein said tank comprises a rectangular fish tank and said liquid is water.

3. An apparatus of claim 2 wherein said sweeper head means has means for providing a supply of oxygen to water in said tank.

4. An apparatus of claim 3 wherein said sweeper head means has means for providing a supply of disinfecting gas to the bottom of said tank.

5. An apparatus of claim 2 wherein said sweeper head means comprises a plurality of sweeper heads.

6. An apparatus for raising fish, comprising, in combination:
    a. a tank for containing a supply of growing fish;
    b. means for flowing water under substantially laminar conditions through said tank in a generally horizontal direction; and,
    c. sweeping apparatus having a sweeper head slideably engaged at the bottom of said tank so that it can move longitudinally along the bottom of said tank, in either direction, to thereby remove particulate matter from the bottom of said tank without significantly interfering with the laminar flow of water in the bulk of said tank.

7. An apparatus of claim 6 wherein said sweeper apparatus is connected to a pump so that water containing entrained particulate material can be sucked into said sweeper head and pumped from the tank.

8. An apparatus of claim 7 wherein said sweeper head additionally contains a means for supplying an oxygen-containing gas to water within said tank.

9. An apparatus of claim 6 wherein said means for flowing water under substantially laminar conditions includes a water inlet reservoir separated from the main tank volume by a fine meshed screen.

10. An apparatus of claim 9 additionally including means for introducing fish food into said tank.

11. An apparatus of claim 6 wherein said sweeper head contains means for providing additional buoyancy to said sweeper head.

12. An apparatus of claim 7 wherein said sweeper head contains means for retaining and diffusing an oxygen-containing gas released by said sweeper head.

13. An apparatus of claim 12 wherein said means for retaining and diffusing additionally provides buoyancy to said sweeper head.

14. An apparatus of claims 6, 9, or 13 wherein said tank has a rectangular shape.

15. An apparatus of claim 9 wherein said means for flowing water under substantially laminar conditions includes a water outlet reservoir separated from the main tank volume by a fine meshed screen.

16. In the raising of fish in a tank wherein fish food is supplied to said tank and particulate matter is removed from the bottom of said tank:

The improvement of providing a water inlet reservoir having means for admitting water thereto and a water outlet reservoir having means for withdrawing water therefrom, said reservoirs being located at opposite ends of the main tank volume and being defined by vertical walls having aligned water passages therethrough, said passages being covered by wire mesh sufficiently fine to cause a slight head of water to build up at said mesh, thereby establishing and maintaining laminar flow of water through said tank in a generally horizontal direction whereby water flowing through said tank does not significantly disturb particulate matter collected at the bottom of said tank.

* * * * *